E. G. BILLINGS.
MEASURING DEVICE.
APPLICATION FILED MAR. 5, 1918.
1,289,618.
Patented Dec. 31, 1918.
2 SHEETS—SHEET 1.
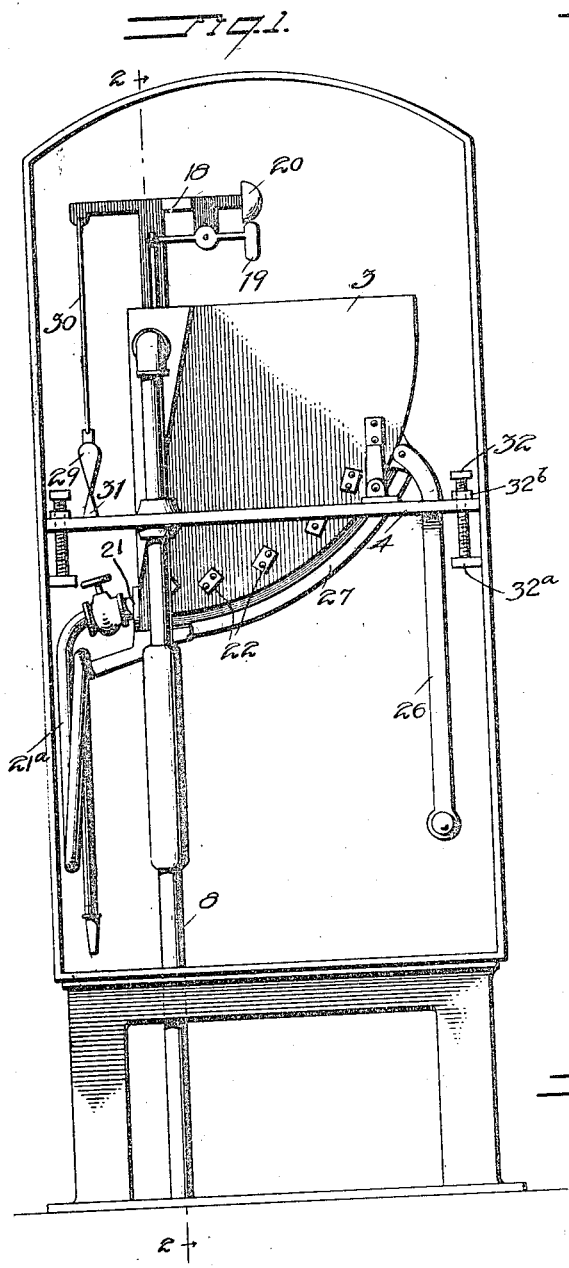
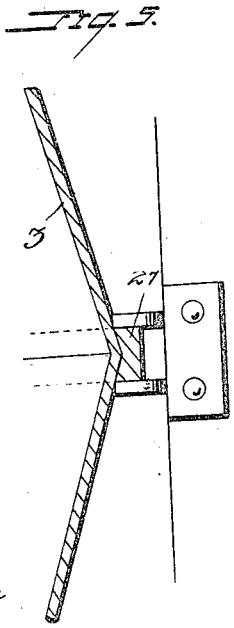
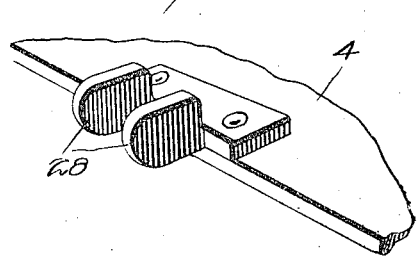
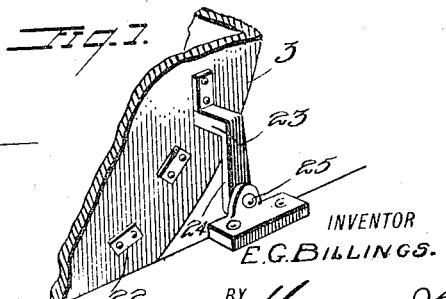
WITNESSES
INVENTOR
E. G. BILLINGS.
BY
ATTORNEYS E. G. BILLINGS.
MEASURING DEVICE.
APPLICATION FILED MAR. 5, 1918.
1,289,618.
Patented Dec. 31, 1918.
2 SHEETS—SHEET 2.
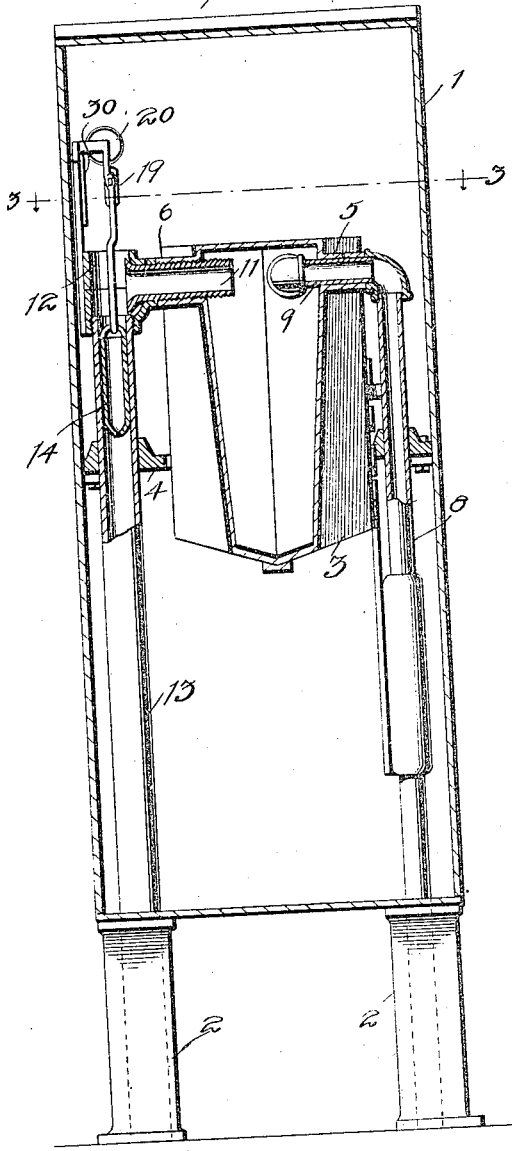
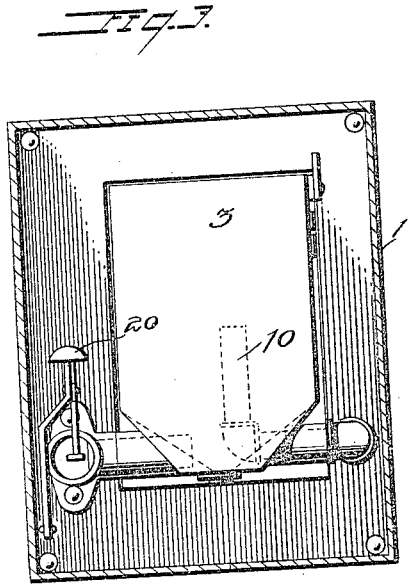
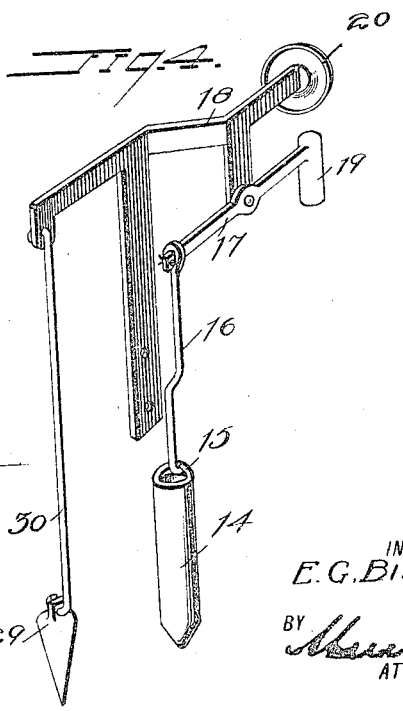
INVENTOR
E. G. BILLINGS,
BY
ATTORNEYS
WITNESSES

UNITED STATES PATENT OFFICE.

EDWIN GEORGE BILLINGS, OF OLEAN, NEW YORK.

MEASURING DEVICE.

1,289,618.　　　　　Specification of Letters Patent.　　Patented Dec. 31, 1918.

Application filed March 5, 1918. Serial No. 220,557.

*To all whom it may concern:*

Be it known that I, EDWIN G. BILLINGS, a citizen of the United States, and a resident of Olean, in the county of Cattaraugus and State of New York, have invented certain new and useful Improvements in Measuring Devices, of which the following is a specification.

My invention is an improvement in measuring devices, and has for its object to provide a device of the character specified wherein a swinging tank is provided, adjustable for various capacities, and having means for indicating the filling of the tank and controlled by the overflow of the tank.

In the drawings:

Figure 1 is a front view of the improved tank;

Fig. 2 is a section on the line 2—2 of Fig. 1, looking in the direction of the arrows adjacent the line;

Fig. 3 is a section on the line 3—3 of Fig. 2, looking in the direction of the arrows adjacent the line;

Fig. 4 is a perspective view of the alarm mechanism;

Fig. 5 is a horizontal section through the guide mechanism of the tank;

Fig. 6 is a perspective view of the guide lugs;

Fig. 7 is a partial perspective view of the bottom of the tank, showing the capacity adjusting mechanism.

In the present embodiment of the invention, a casing 1 is provided, of substantially rectangular outline, the said casing being supported by legs 2 and having a curved or rounded top as shown. The front of the casing is open, as indicated in Fig. 1, and within the casing is mounted a tank 3, the said tank being mounted to swing and being of approximately quadrantal form in a vertical plane.

This tank is arranged within an opening in a transverse partition plate 4, and the tank is provided at its opposite sides with bearing nipples 5 and 6, respectively. It will be noticed from an inspection of Fig. 1 that the bottom and right side of the tank are a continuous curve, and the bearing nipples 5 and 6 are arranged at the opposite corner from this curved side and bottom of the tank.

A supply pipe 8 extends upwardly from a suitable tank or reservoir, and at its upper end the pipe 8 has an angular portion 9 which is journaled in the nipple 5. The angular portion has an extension 10 at its inner end which delivers at approximately the center of the tank, and a drain or overflow pipe 11 is held in the bearing 6, the said pipe being of greater capacity than the inlet or supply pipe 8—9. This drain pipe is threaded into the bearing 6 and is journaled at its outer end in the lateral branch of a T 12 which is connected with the upper end of a drain pipe 13 leading to a suitable place of disposal for the overflow, as, for instance, the tank or reservoir from which it is originally supplied.

Within the drain pipe 13 is arranged a container or receptacle 14, open at its upper end, and provided with a bail 15 at the said end. A link 16 connects the bail with one end of a lever 17 which is pivoted to a fixed support or bracket 18 held in the casing 1. The lever 17 has a hammer 19 at the opposite end, and the bracket 18 supports a bell 20 above the hammer.

The receptacle 14 has a restricted opening in its bottom as indicated in Fig. 2, and it is so held in the drain pipe 13 that when the liquid begins to overflow through the pipe 11 it will pass into the receptacle 14 and will swing the lever 17 to cause the hammer 19 to strike the bell 20, thus indicating to the operator that the proper amount of liquid is in the tank. The tank has an outlet 21 which is valve controlled, and a hose 21ª is connected with the valve casing. Means is provided for swinging the tank on the pipes 9 and 11 to vary the capacity thereof.

Referring to Figs. 1 and 7, it will be noticed that a series of plates or blocks 22 is secured to the front wall of the tank at the curved side, the said plates or blocks following the curve of the side, and these plates or blocks are adapted to engage the angular portion 23 of a latch lever 24 which is pivoted, as indicated at 25, on the plate 4.

A handle 26 is pivoted to the front of the tank, as shown, and by means of this handle the tank may be swung to cause the latch 24 to engage with any desired plate or block 22. At its bottom the tank is hopper shaped, as shown in Fig. 5, that is, the walls consist of two portions extending at an angle with respect to each other, and a guide rail 27 is secured to the bottom at this point. This rail moves between a pair of lugs 28 on the plate 4 before mentioned, thus guiding the tank and holding it from lateral swinging movement. A plumb-bob 29 is suspended from the bracket 18 at the opposite end of the bracket from the bell 20 by means of a link 30, and this bob coöperates with an indicator 31 on the plate 4.

Four leveling screws 32 support the plate 4, and this plate carries the tank and the bracket 18 which supports the bell and the plumb-bob. By means of the screws the plate may be leveled to cause the point of the bob to hang directly above the point of the indicator 31.

In operation, the tank is set at the desired capacity by means of the handle 26. With a five gallon tank, for instance, when the tank is in the position of Fig. 1, it can be filled to its full capacity. When the latch lever is beneath the second plate from the top the tank will have a capacity, for instance, of four gallons, and in the same manner with the remaining blocks. Having set the tank, the operator admits the liquid and as the tank fills to the level of the overflow the liquid will flow through the overflow into the container 14 and will eventually tip the lever 17 to cause the hammer 19 to strike the bell 20, thus warning the operator that the correct amount is in the tank. The tank is now emptied by means of the hose 21ª.

I claim:

1. A device of the character specified, comprising a tank or reservoir, a supply pipe and an overflow pipe arranged at opposite corners of the tank, said tank being mounted to swing upon said pipes, means for holding the tank in adjusted position, a container below the overflow pipe and having a restricted opening in its bottom, said container being movable downwardly under the weight of the overflowing liquid, and a signal controlled by the downward movement of the container, said signal comprising a bell, a lever on one end of which the container is suspended, the other end of the lever bearing a hammer for engaging the bell.

2. A device of the character specified, comprising a tank or reservoir, a supply pipe and an overflow pipe arranged at opposite corners of the tank, said tank being mounted to swing upon said pipes, means for holding the tank in adjusted position, a container below the overflow pipe and having a restricted opening in its bottom, said container being movable downwardly under the weight of the overflowing liquid, and a signal controlled by the downward movement of the container.

EDWIN GEORGE BILLINGS.

Witnesses:
H. R. WILSON,
GEO. H. PIERCE.

Copies of this patent may be obtained for five cents each, by addressing the "Commissioner of Patents, Washington, D. C."